United States Patent [19]

Matick

[11] Patent Number: 4,589,092

[45] Date of Patent: May 13, 1986

[54] DATA BUFFER HAVING SEPARATE LOCK BIT STORAGE ARRAY

[75] Inventor: Richard E. Matick, Peekskill, N.Y.

[73] Assignee: International Business Machines Corporation, Armonk, N.Y.

[21] Appl. No.: 560,479

[22] Filed: Dec. 12, 1983

[51] Int. Cl.[4] .................. G06F 12/10; G06F 12/14
[52] U.S. Cl. ................................................. 364/900
[58] Field of Search ... 364/200 MS File, 900 MS File

[56] References Cited

U.S. PATENT DOCUMENTS

| | | | |
|---|---|---|---|
| 4,037,214 | 7/1977 | Birney et al. | 364/200 |
| 4,096,573 | 6/1978 | Heller et al. | 364/200 |
| 4,136,385 | 1/1979 | Gannon et al. | 364/200 |
| 4,145,738 | 3/1979 | Inoue et al. | 364/200 |
| 4,170,039 | 10/1979 | Beacom et al. | 364/200 |
| 4,332,010 | 5/1982 | Messina et al. | 364/200 |
| 4,347,565 | 8/1982 | Kaneda et al. | 364/200 |
| 4,400,770 | 8/1983 | Chan et al. | 364/200 |

OTHER PUBLICATIONS

U.S. pending application Ser. No. 246,788 filed 3/28/81 by Chan et al. Cache Locking Controls in a Multiprocessor.

*Primary Examiner*—Harvey E. Springborn
*Attorney, Agent, or Firm*—John J. Goodwin

[57] ABSTRACT

A separate lock bit array (LBA) is provided in combination with a translation lookaside buffer (TLB) in a data processing system such that the lock bits are stored in and accessed from the LBA. A segment register with a portion for an "S" bit is included and when S=1, a translation operation for the lock bits is performed in parallel with the TLB accessing by use and operation of the LBA. In such operation, when S=1, lower order virtual bits from a central processing unit (CPU) address register are applied to the LBA to select one of the rows of the LBA which consists of virtual address bits and lock bits. Segment identification bits from the segment register are combined with virtual bits from the CPU address register and are applied to first and second compare circuits. If there is a match in the first compare circuit with a first group of virtual bits from an LBA location, a first flag signal is generated and applied to a gate circuit to gate out a first associated group of lock bits from a first location. Likewise, the combination of bits are compared with $VA'_b$ bits in the second compare circuit, and if a match occurs in the second compare circuit, a second flag signal is produced which is applied to a gate to gate out a second associated group of lock bits from a second location of the LBA.

7 Claims, 1 Drawing Figure

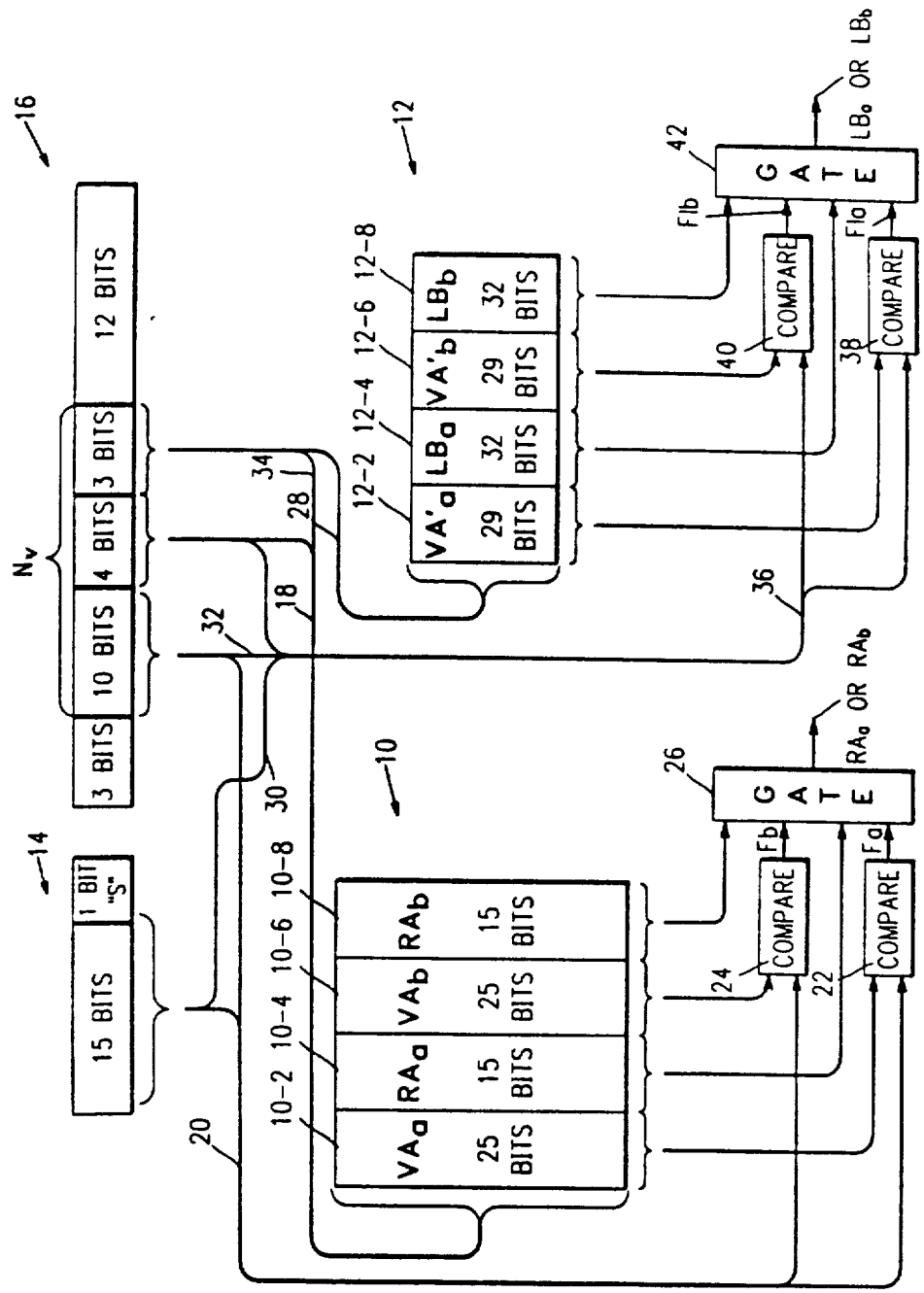

DATA BUFFER HAVING SEPARATE LOCK BIT STORAGE ARRAY

BACKGROUND OF THE INVENTION

1. Field of the Invention

This invention relates to data processing systems employing data buffers, and more particularly to the use of lock bits in data buffers to access logic records.

2. Description of the Prior Art

It is known to use lock bits in the entry of data buffers for controlling access to logic record pieces. The lock bits are presently stored along with the associated logic record pieces in the translation lookaside buffer (TLB) such that the TLB must include space for such lock bits.

A number of prior art patents are known which involve translation lookaside buffers; however, none of the references relate to storing lock bits in a separate array rather than storing the lock bits with each TLB entry.

For example, U.S. Pat. No. 4,096,573 entitled DLAT SYNONYM CONTROL MEANS FOR COMMON PORTIONS OF ALL ADDRESS SPACES, issued June 20, 1978 to Heller et al relates to the use of special controls in a processor to prevent synonym entries in a translation lookaside buffer for a system which has buffer entries that can concurrently translate virtual page addresses in multiple address spaces into real main storage page frame addresses.

U.S. Pat. No. 4,136,385 entitled SYNONYM CONTROL MEANS FOR MULTIPLE VIRTUAL STORAGE SYSTEMS, issued Jan. 23, 1979 to Gannon et al, is similar to the above but describes a different type of controls.

U.S. Pat. No. 4,145,738 entitled PLURAL VIRTUAL ADDRESS SPACE PROCESSING SYSTEM, issued Mar. 20, 1979 to Inoue et al, describes a system having a plurality of virtual address spaces wherein a virtual address is translated into a real address for accessing a main memory and the translation result is stored in a translation lookaside buffer, as in a processing system having a single virtual address space. Thereafter, in the case of the same virtual address as the above, the translation lookaside buffer is retrieved to translate the virtual address into a real address.

In U.S. Pat. No. 4,347,565 entitled ADDRESS CONTROL SYSTEM FOR SOFTWARE SIMULATION, issued Aug. 31, 1982 to Kaneda et al, an address control system is described for software simulation in a virtual machine system having a virtual storage function. When a simulator program is simulating an instruction of a program to be simulated, an address translation of an operand address in the program to be simulated is achieved using a translation lookaside buffer.

U.S. Pat. No. 4,332,010 entitled CACHE SYNONYM DETECTION AND HANDLING MECHANISM, issued May 25, 1982 to Messina et al describes a fast synonym detection and handling mechanism for a cache directory utilizing virtual addressing in data processing systems. The cache directory is divided into groups of classes as a function of the number of cache address bits derived from a translatable part of a requested logical address. The cache address is derived from a non-translatable part of the logical address which is used to simultaneously select one class in each of the groups. The selected class entries are simultaneously compared with one or more dynamic lookaside address translator translated absolute addresses. Compare signals, one for each class entry per absolute address, are routed to a synonym detection circuit.

Other U.S. patents in this area which describe address translation and register accessing using keys are 4,037,214 and 4,170,039.

In co-pending U.S. patent application filed Mar. 23, 1981 by Chan et al, entitled CACHE LOCKING CONTROLS IN A MULTIPROCESSOR, now U.S. Pat. No. 4,513,367, a lock bit array with four lock bits representing four line entries in a cache processor directory, is shown as being separate from the cache processor directory so that all the lock bits can be reset simultaneously. In this system, the number of lock bits is not reduced.

SUMMARY OF THE INVENTION

An object of the present invention is to provide apparatus and techniques for reducing the number of lock bits required in a data processor using a translation lookaside buffer.

Another object of the present invention is to provide a separate lock bit array for a data processor using a translation lookaside buffer.

Still another object of the present invention is to provide a system including a translation lookaside buffer and a separate lock bit array wherein the lock bit array is accessed in parallel with the translation lookaside buffer.

The foregoing and other objects, features and advantages of this invention will be apparent from the following more particular description of the invention, as illustrated in the accompanying drawing.

DESCRIPTION OF THE DRAWING

The FIGURE is a schematic block diagram of an embodiment of a data processing system including a translation lookaside buffer and a lock bit storage array according to the principles of the present invention.

DESCRIPTION OF THE INVENTION

For purposes of explanation, a computer architecture wherein a translation lookaside buffer (TLB) with 4K pages, 32 logical record pieces per page and 128 bytes per record piece will be discussed. It will be appreciated by one skilled in the art that the invention is applicable to other architecture embodiments controlling access to logic record pieces of 128 bytes each normally requires the use of 32 "lock bits" in each entry of the TLB, one lock bit for each record piece on a page. These lock bits are used mainly on data base type records in addition to a storage protect key. As such, less than 10% of the pages will require lock bits. In other words, on average, only 10% of the entries in the TLB will ever be using the lock bits, i.e., 90% of the lock bit space is wasted. Whether or not the lock bits are to be used for access control is determined by one "S" bit in a segment register. If $S=0$, these lock bits are ignored; if $S=1$, these lock bits are used to control access to each 128 byte piece of that page. Thus, $S=1$ will occur less than 10% of the time. If these 32 lock bits are physically stored with each TLB entry, then they increase the size of the TLB by 75% or more. This not only makes the array slower, but in many cases requires extra chips in a chip processing system which also introduces packaging delay. Since the TLB is in the critical path of the system, any reduction of path delay is very desirable.

In the present invention, using the fact that only 10% of the lock bit entries are ever used, the lock bits are placed in a separate array LBA (Lock Bit Array) which has approximately 1/10 as many entries as the TLB.

Referring to the drawing, a schematic illustration of the data buffer system is shown including a translation lookaside buffer storage 10 and a lock bit array storage 12. The translation lookaside buffer 10, in this specific illustration, contains two virtual address locations 10-2 and 10-4 ($VA_a$ and $VA_b$) having 128 rows of 25 bits and contains two corresponding real address (RA) locations 10-6 and 10-8 with 128 rows of 15 bits.

The lock bit array storage 12 is similarly organized with two storage areas 12-2 and 12-4 for virtual addresses ($VA'_a$ and $VA'_b$) each 29 bits wide and two storage areas 12-6, 12-8 for lock bits, $LB_a$ and $LB_b$ each 32 bits wide. Lock bit array storage 12 has eight rows.

A segment register 14 is provided containing the aforesaid "S" bit (0 or 1) and 15 segment identification bits. A 32 bit CPU address register 16 is provided including 17 $N_v$ bits wherein $N_v$ represents the number of virtual bits. The contents of registers 14 and 16 are obtained from the operating system and loaded in a conventional manner. Whether S=1 or S=0 in register 14, the 7 lower order bits (4+3) of $N_v$ are combined on line 18 and are applied to TLB 10 to select one of the rows in TLB 10 in a conventional manner as employed in prior art translation lookaside buffers, and the remaining 10 bits of $N_v$ in register 16 and the 15 segment identification bits from register 14 are combined on line 20 and applied to compare circuits 22 and 24. The 28 bits on line 20 are compared in circuit 22 with $VA_a$ from location 10-2 and are compared in circuit 24 with $VA_b$ from location 10-6. If a "match" occurs in circuit 22 on $VA_a$, an $F_a$ flag signal is produced from compare circuit 22 and applied to gate circuit 26. Likewise, if a "match" occurs on $VA_b$, an $F_b$ flag signal is produced from compare circuit 24 and applied to gate circuit 26. In gate circuit 26, an $F_a$ signal from circuit 22 will gate $RA_a$ from location 10-4 through to the cache directory. Likewise, an $F_b$ signal from circuit 24 will gate $RA_b$ from location 10-8 through to the cache directory. Thus far the description of registers 14 and 16 and TLB 10 has been typical of the accessing operation of a conventional TLB whether S=1 or S=0.

In the present invention, when S=1, a translation operation for the lock bits is performed in parallel with the TLB accessing by use and operation of the LBA 12. In such operation, when S=1, the 3 lower order bits of $N_v$ are applied on line 28 to LBA 12 to select one of the 8 rows. Because the LBA 12 has fewer entries, the next 4 lower order bits of $N_v$, not sent from register 16 but are contained within the LBA 12 virtual address ($VA'_a$ and $VA'_b$) along with the 25 bits found in $VA_a$ and $VA_b$ of TLB 10. Thus, location 12-2 and 12-6 are 25+4=29 bits wide and two conventional type compare operations are performed to select the correct lock bits when S=1. The 15 segment identification bits from register 14 on line 30 are combined with the 10 higher order $N_v$ bits from register 16 on line 32 as well as the aforesaid 4, lower order $N_v$ bits on line 34. These combined 29 bits on line 36 are applied to compare circuit 38 and compare circuit 40. If there is a match in compare circuit 38 with the 29 $VA'_a$ bits from location 12-2, a $Fl_A$ signal is generated and applied to gate circuit 42 to gate out 32 lock bits $LB_a$ from location 12-4. Likewise, the 29 bits on line 36 are compared with the 29 $VA'_b$ bits in compare circuit 40, and if a match occurs, an $Fl_B$ signal is produced which is applied to gate 42 to gate through the 32 $LB_B$ lock bits from location 12-8.

Because there are fewer entries in LBA 12 than in TLB 10, the virtual addresses contained within LBA 12 include the next 4 lower order bits of $N_v$ in addition to the equivalent 25 bits maintained in TLB 10. Thus, there is a 29 bit comparison in compare circuits 38 and 40 to select the proper lock bits when S=1. It should be noted that for a match on $VA_a$ (location 10-2) in TLB 10, the lock bits may be in $VA'_b$ (location 12-6) on LBA 12, providing complete generality.

It is significant to note that the access time of the critical path through TLB 10 is not affected by this implementation of the lock bits for cases when S=0 because no search in LBA 12 is made. When S=1, the search for the lock bits is done in parallel and since the size of LBA 12 is considerably smaller than TLB 10, this part of the search will occur faster, hence the lock bits will be available from gate 42 before the real address RA of the page is obtained from gate 26.

Having thus described my invention, what I claim as new, and desire to secure by Letters Patent is:

1. Address translation apparatus for a virtual memory data processing system comprising:
   a translation lookaside buffer (TLB) array containing a plurality of virtual and associated real addresses,
   a discrete lock bit array (LBA) containing a subgroup of said virtual addresses and separate lock bits associated with each of said virtual addresses of said subgroup,
   means for accessing said TLB for obtaining a real address output associated with a given virtual address input signal, and
   means for accessing said LBA for obtaining a lock bits output associated with said given virtual address input signal when said given virtual address is contained within said subgroup of virtual addresses in said LBA wherein a lock bit associated with a translated real address and the translated real address are accessed in parallel from the individual arrays.

2. Address translation apparatus for a virtual memory data processing system according to claim 1 wherein said TLB array includes a plurality of storage locations containing said virtual and real addresses, and entry means responsive to virtual data bits from a CPU register of said data processing system for selecting given virtual addresses and real addresses associated with said virtual data bits.

3. Address translation apparatus for a virtual memory processing system according to claim 2 further including a segment register for containing segment identification bits and a given "S" bit position containing either a "1" or a "0" bit, first compare circuits each having one input connected to said CPU register and said segment register and another input connected to a virtual address storage location of said TLB array for comparing virtual bits from said CPU register with said selected virtual address from said TLB array and producing an output signal when a comparison match occurs.

4. Address translation apparatus for a virtual memory processing system according to claim 3 further including first gating means connected to the outputs of said first compare circuits and said TLB array storage locations containing said real addresses for gating said real address associated with said matched virtual address to an output line.

5. Address translation apparatus for a virtual memory processing system according to claim 4 wherein said LBA includes a plurality of storage locations for said subgroup of virtual addresses and lock bits associated with each one of said virtual addresses of said subgroup, said LBA further including entry means responsive to virtual data bits from said CPU register for selecting given ones of said LBA subgroup virtual addresses when said "S" bit position of said segment register contains a "1" bit.

6. Address translation apparatus for a virtual memory processing system according to claim 5 further including second compare circuits each having one input connected to said CPU register and said segment register and a second input connected to a virtual address location of said LBA for comparing virtual bits from said CPU register with said selected virtual addresses from said LBA subgroup array and producing an output signal when a comparison match occurs.

7. Address translation apparatus for a virtual memory processing system according to claim 6 further including second gating means connected to the outputs of said second compare circuits and said LBA storage locations containing said lock bit data associated with said matched selected virtual address of said subgroup for gating said associated lock bit data to a second output line, said first output line therefore containing a selected real address associated with a virtual address and said second output line containing any lock bit data which may be associated with said selected real address.

* * * * *